US012228188B2

(12) United States Patent
Moffitt, Jr.

(10) Patent No.: US 12,228,188 B2
(45) Date of Patent: Feb. 18, 2025

(54) METHODS AND APPARATUS FOR A 3D-PRINTED SPRING

(71) Applicant: Moffitt, LLC, Phoenix, AZ (US)

(72) Inventor: Robert Moffitt, Jr., Phoenix, AZ (US)

(73) Assignee: Moffitt, LLC, Phoenix, AZ (US)

( * ) Notice: Subject to any disclaimer, the term of this patent is extended or adjusted under 35 U.S.C. 154(b) by 906 days.

(21) Appl. No.: 17/320,102

(22) Filed: May 13, 2021

(65) Prior Publication Data
US 2022/0364621 A1  Nov. 17, 2022

(51) Int. Cl.
| | |
|---|---|
| *F16F 1/373* | (2006.01) |
| *B29C 64/153* | (2017.01) |
| *B29C 64/188* | (2017.01) |
| *B33Y 10/00* | (2015.01) |
| *B33Y 40/20* | (2020.01) |
| *B33Y 80/00* | (2015.01) |
| *F16F 1/44* | (2006.01) |
| *B29L 31/00* | (2006.01) |

(52) U.S. Cl.
CPC ............ *F16F 1/373* (2013.01); *B29C 64/153* (2017.08); *B29C 64/188* (2017.08); *B33Y 10/00* (2014.12); *B33Y 40/20* (2020.01); *B33Y 80/00* (2014.12); *F16F 1/44* (2013.01); *B29L 2031/7282* (2013.01); *B29L 2031/7742* (2013.01); *F16F 2234/02* (2013.01); *F16F 2238/026* (2013.01)

(58) Field of Classification Search
CPC ......... B33Y 10/00; B33Y 30/00; B33Y 80/00; F16F 2234/02
See application file for complete search history.

(56) References Cited

U.S. PATENT DOCUMENTS

| | | | |
|---|---|---|---|
| 3,735,058 A | 5/1973 | Berry | |
| 3,973,496 A | 8/1976 | Cerny et al. | |
| 6,095,823 A | 8/2000 | Banks | |
| 7,686,293 B2 | 3/2010 | Baena et al. | |
| 9,393,000 B2* | 7/2016 | Donhowe | A61B 34/30 |
| 9,570,896 B2* | 2/2017 | Huang | H02G 3/32 |
| 9,687,036 B2* | 6/2017 | Ditnes | A41F 17/02 |
| 9,849,714 B2* | 12/2017 | Lin | B42F 1/10 |
| 9,856,894 B2* | 1/2018 | Lin | F16B 2/10 |
| 10,213,919 B2* | 2/2019 | Axinte | B25J 9/1676 |
| 10,729,885 B2* | 8/2020 | Hinman | A61M 25/0138 |
| 10,760,635 B2* | 9/2020 | Rausch | F16F 1/042 |
| 10,813,410 B2* | 10/2020 | Guest | A43C 11/16 |
| 10,891,786 B2* | 1/2021 | Zeng | G05B 19/408 |
| 10,926,529 B2* | 2/2021 | Chisena | B33Y 10/00 |
| 10,953,579 B2* | 3/2021 | Pruitt | B29C 45/76 |
| 10,960,423 B1* | 3/2021 | Kang | B05B 11/1077 |

(Continued)

FOREIGN PATENT DOCUMENTS

| | | | |
|---|---|---|---|
| CN | 108068675 B | * | 2/2021 |
| CN | 112692200 A | * | 4/2021 |

(Continued)

*Primary Examiner* — Robert A. Siconolfi
*Assistant Examiner* — Mahbubur Rashid
(74) *Attorney, Agent, or Firm* — Noblitt & Newson, PLLC

(57) ABSTRACT

Various embodiments of the present technology may provide methods and apparatus for a 3D-printed spring. The 3D-printed spring may be formed from a plurality of toroidal elements spaced apart from each other and connected with a plurality of connectors. Each connector connects one toroidal element to a directly adjacent toroidal element.

19 Claims, 9 Drawing Sheets

(56) References Cited

U.S. PATENT DOCUMENTS

| | | | |
|---|---|---|---|
| 10,962,075 B2* | 3/2021 | Dubost | F16F 7/003 |
| 10,981,334 B2* | 4/2021 | Querol Esparch | B29C 71/02 |
| 2004/0034994 A1 | 2/2004 | Chang | |
| 2008/0286036 A1* | 11/2008 | Macnamara | A61B 1/0055 |
| | | | 29/896.9 |
| 2012/0040541 A1 | 2/2012 | Liskow | |
| 2015/0232011 A1* | 8/2015 | Kajio | B60N 3/02 |
| | | | 296/1.02 |
| 2015/0251482 A1* | 9/2015 | Lin | B42F 1/006 |
| | | | 248/468 |
| 2015/0359309 A1* | 12/2015 | Kim | A45D 8/20 |
| | | | 132/277 |
| 2018/0104448 A1* | 4/2018 | Hinman | A61M 25/0105 |
| 2020/0260807 A1* | 8/2020 | Pandolfino | A44B 6/00 |

FOREIGN PATENT DOCUMENTS

| | | | |
|---|---|---|---|
| CN | 212860487 U | * | 4/2021 |
| EP | 2810745 A1 | * | 12/2014 |
| EP | 3819049 A1 | * | 5/2021 |
| KR | 20140086101 A | * | 1/2014 |

* cited by examiner

METHODS AND APPARATUS FOR A 3D-PRINTED SPRING

BACKGROUND OF THE TECHNOLOGY

Conventional springs that are used to provide compressive, extension, or torsion force are commonly made from wire and a manufactured as a stand-alone element. The spring element may then be assembled with other elements to form a final product.

3D-printed technology provides the ability to build complex, three-dimensional objects without the need for numerous discrete parts/elements. 3D printing is a manufacturing process in which material is laid down, layer by layer, to form a three-dimensional object. This is deemed an additive process because the object is built from scratch, as opposed to subtractive processes in which material is cut, drilled, milled, or machined off 3D printers can be used to quickly create product models and prototypes, but they're increasingly being used to make final products as well.

SUMMARY OF THE INVENTION

Various embodiments of the present technology may provide methods and apparatus for a 3D-printed spring. The 3D-printed spring may be formed from a plurality of toroidal elements spaced apart from each other and connected with a plurality of connectors. Each connector connects one toroidal element to a directly adjacent toroidal element.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 1:
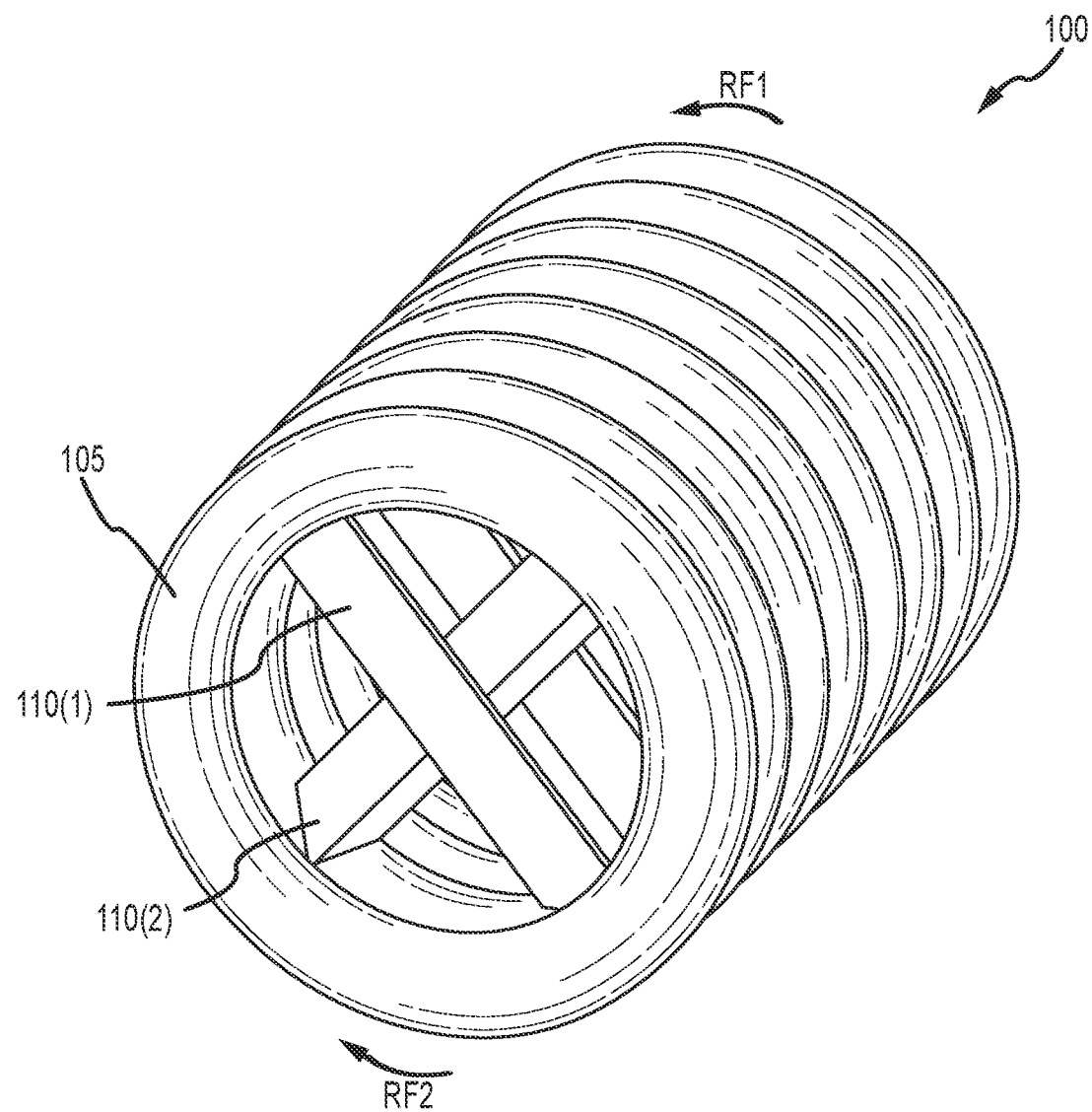
FIG. 1 is an isometric view of a 3D-printed spring in accordance with an exemplary embodiment of the present technology.
Figure 6:
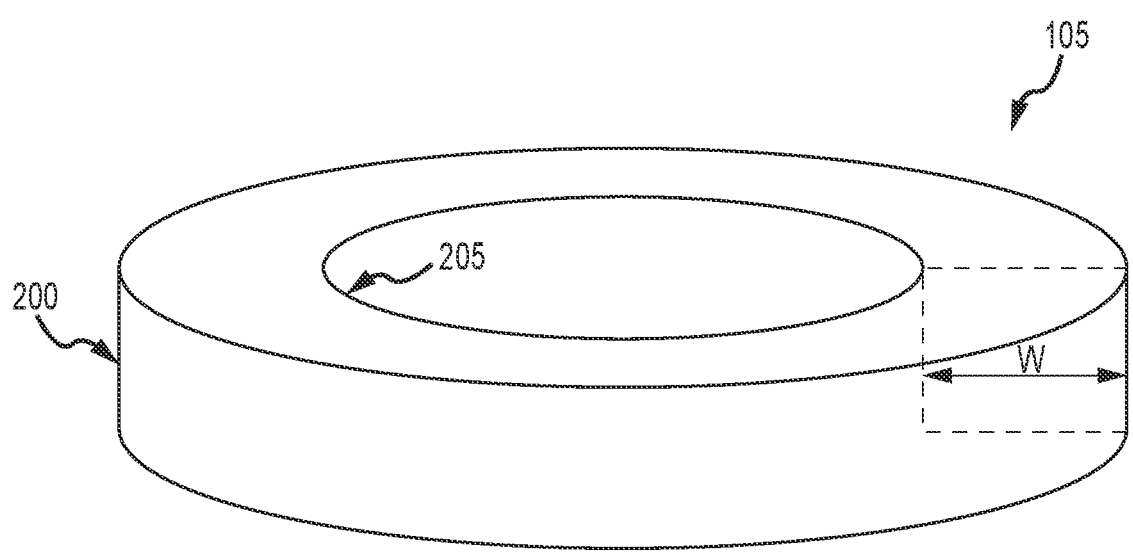
Figure 7:
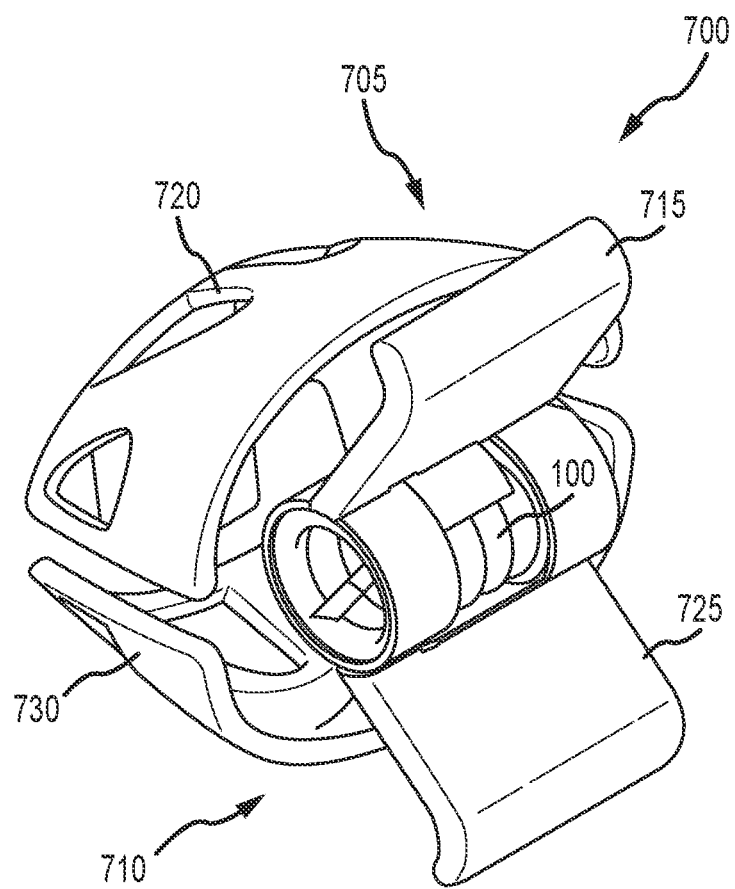
Figure 8:
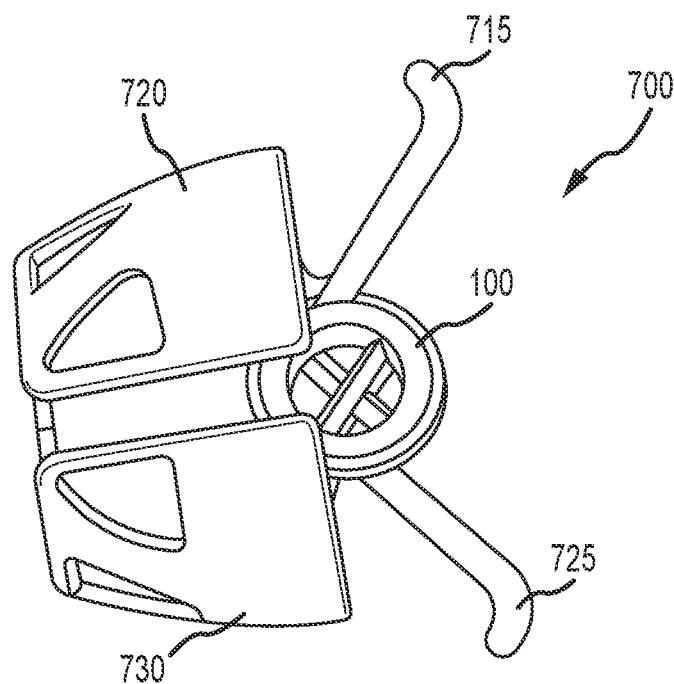
Figure 9:
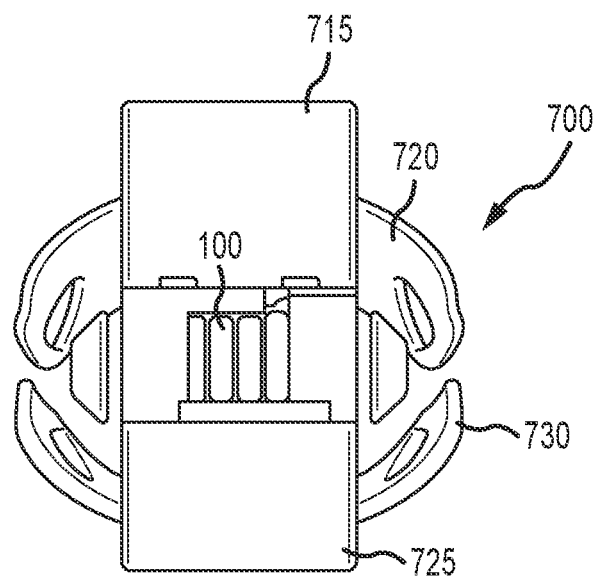
Figure 10:
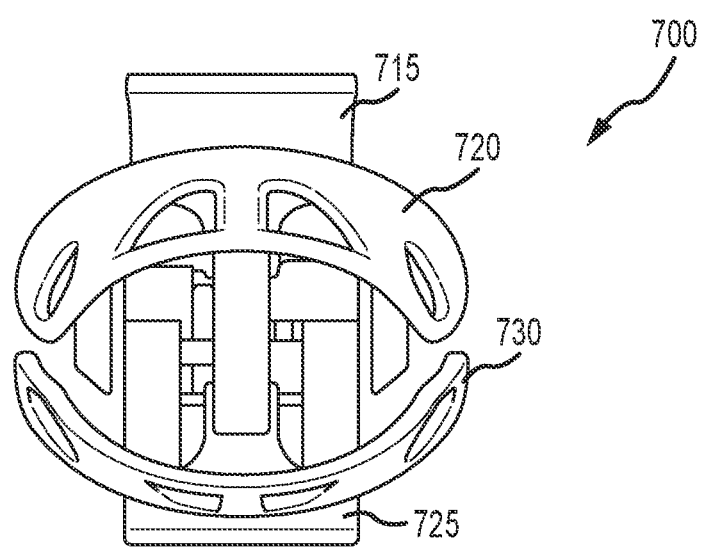

FIG. 6 representatively illustrates an alternative-shaped toroidal element in accordance with embodiments of the present technology; and FIG. 7 representatively illustrates a 3D-printed clip integrating the 3D spring of FIG. 1 in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ an outer structure connected together with any number of connectors having various shapes, lengths, and connection points. In addition, the present technology may be formed using any suitable material.

Methods and apparatus for a 3D-printed spring according to various aspects of the present technology may be integrated in any suitable system and/or device, such as door hinges, pool safety fencing, tension sensors, alignment parts (e.g., automotive parts), compression springs, workout equipment (e.g., those for strengthening the wrist, forearm, and/or grip), artwork, kitchen accessory, audio equipment (e.g., for vibration dampening), robotics (e.g., a catapult), shoes (e.g., within the soles to provide shock absorption), cushions (e.g., bike seats, internal springs for mattresses, and/or seat cushions), or any other application where compressive, extension, or torsion force is desired. For example, and referring to FIG. 7, the 3D-printed spring may be integrated into a clip (such as a hair clip) to provide tension on two interleaved, comb-shaped portions.

Referring to FIGS. 1-6, an exemplary 3D-printed spring 100 may be arranged to provide compression, extension, or torsion force against an external force.

Figure 3:
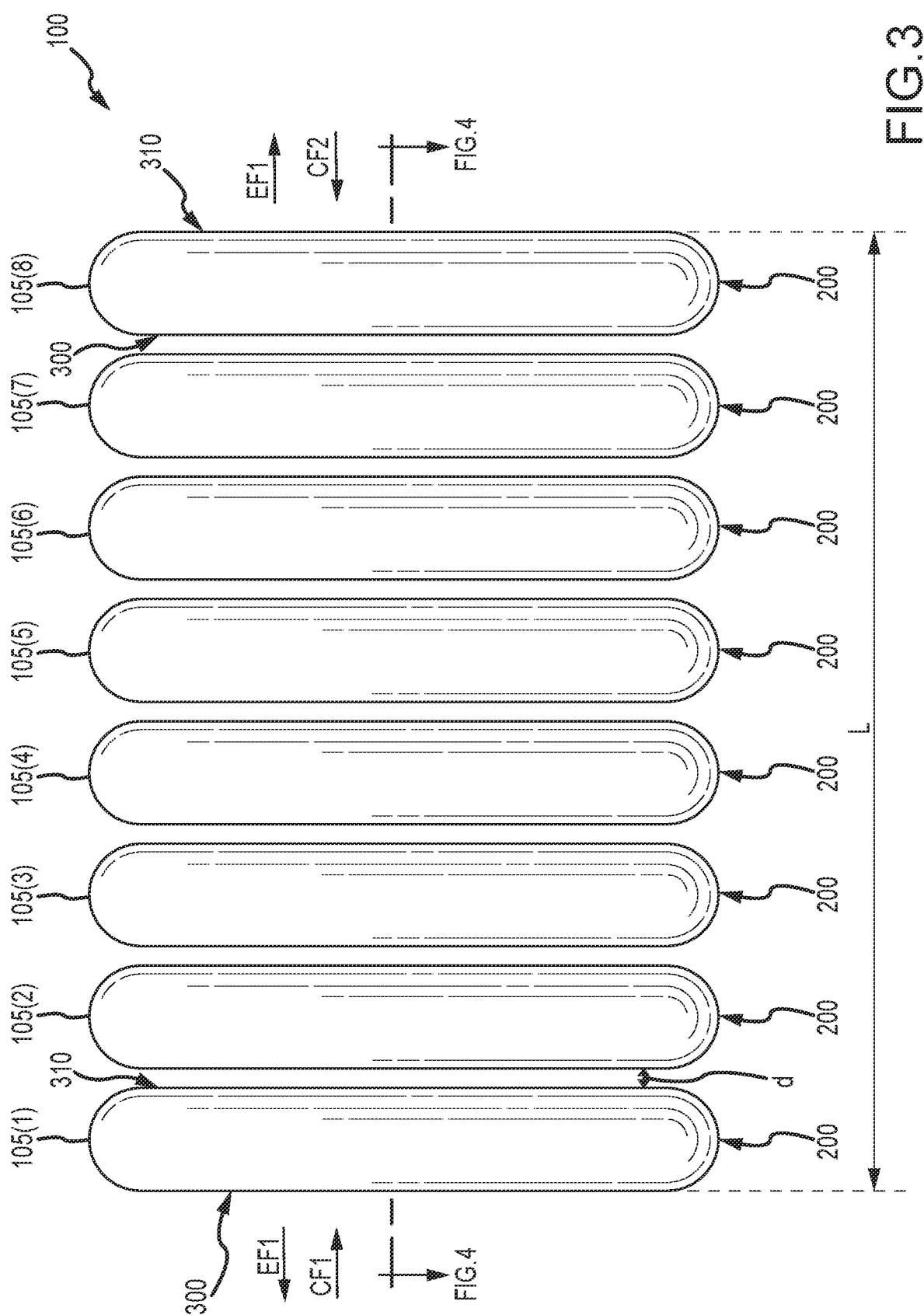
FIG. 3 is a side view of the 3D-printed spring in accordance with an exemplary embodiment of the present technology.
Figure 4:
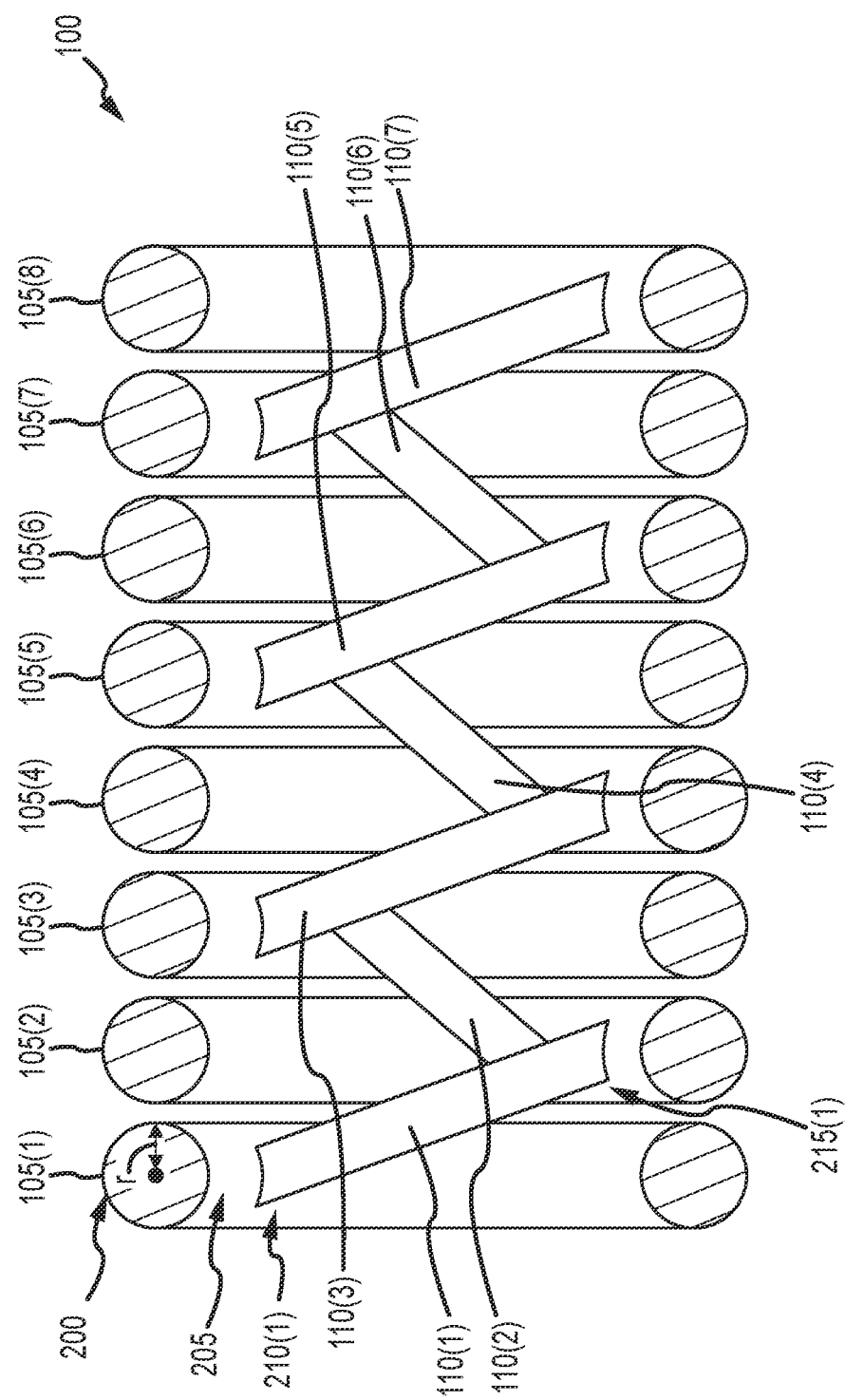
FIG. 4 is a cross-sectional view of the 3D-printed spring in accordance with an exemplary embodiment of the present invention.

For example, in various embodiments, the 3D printed spring 100 may provide a compression force when a first external force CF1 and/or a second external force CF2 is applied to the first and last toroidal elements (e.g., the first toroidal element 105(1) and the eighth toroidal element 105(8)). The first external force CF1 may be applied in a first direction that is perpendicular to the toroidal element 105. The second external force CF2 may be applied in a second direction, opposite the first direction, that is perpendicular to the toroidal element 105. For example, FIG. 3 illustrates the toroidal elements 105 oriented in a vertical manner. In this case, the first external force CF1 may be horizontal, and thus, perpendicular to the toroidal element 105. Similarly, the second external force CF2 may be horizontal, and thus, perpendicular to the toroidal element 105. Alternatively, the 3D spring 100 may be reoriented, such that the toroidal elements 105 are oriented in a horizontal manner. In this case, the first and second external forces CF1, CF2 would be applied in a vertical direction (up or down).

In various embodiments, the 3D printed spring 100 may provide an extension force when a third external force EF1 and/or a fourth external force EF2 is applied to the first and last toroidal elements (e.g., the first toroidal element 105(1) and the eighth toroidal element 105(8)). The third external force EF1 may be applied in a first direction that is perpendicular to the toroidal element 105. The fourth external force EF2 may be applied in a second direction, opposite the first direction, that is perpendicular to the toroidal element 105. For example, FIG. 3 illustrates the toroidal elements 105 oriented in a vertical manner. In this case, the third external force EF1 may be horizontal, and thus, perpendicular to the toroidal element 105. Similarly, the fourth external force EF2 may be horizontal, and thus, perpendicular to the toroidal element 105. Alternatively, the 3D spring 100 may be reoriented, such that the toroidal elements 105 are oriented in a horizontal manner. In this case, the first and second external forces CF1, CF2 would be applied in a vertical direction (up or down).

In various embodiments, the 3D printed spring 100 may provide a torsion force when a fifth external force RF1 and/or a sixth external force RF2 is applied to at least two of the toroidal elements. For example, the fifth external force RF1 may be applied to the first toroidal element 105(1) and the sixth external force RF2 may be applied to the eighth toroidal element 105(8). Alternatively, the fifth external force RF1 may be applied to the first and third toroidal elements 105(1), 105(3), and the sixth external force RF2 may be applied to the sixth and eighth toroidal elements 105(6), 105(8). Alternatively, the fifth external force RF1 may be applied to the first, third, fifth, and seventh toroidal element 105(1), 105(3), 105(5), 105(7) and the sixth external force RF2 may be applied to the second, fourth, sixth, and eighth toroidal elements 105(2), 105(4), 105(6), 105(8). It will be understood that the fifth and sixth external forces RF1, RF2 may be applied to any number or any combination of toroidal elements based on the particular application and/or the desired spring/torsion force. For example, in some applications, applying the fifth and sixth external forces RF1, RF2 to four toroidal elements (e.g., the first and third toroidal elements 105(1), 105(3) and the sixth and eighth toroidal elements 105(6), 105(8)) will result in a torsion force greater than applying the fifth and sixth external forces RF1, RF2 to only two toroidal elements (e.g., the first toroidal element 105(1) and the eighth toroidal element 105(8)). In other words, the greater the number of toroidal elements that are directly affected by the external force, the greater the effective torsion force.

The fifth external force RF1 may be applied in a first direction that rotates the toroidal element 105. The sixth external force RF2 may be applied in a second direction that rotates the toroidal element 105, wherein the second direction is opposite the first direction.

In various embodiments, the external forces (EF1, EF2, CF1, CF2 RF1, RF2) may be applied to one or more locations on the 3D-printed spring 100 and may be applied in one or more directions. For example, the external force may be applied to one location on a toroidal element or multiple locations on a toroidal element. In addition, more than one external force may applied at the same time. For example, the torsion force may be applied at the same time as the compression force. The source of the external force may be from an element that is integrated or otherwise fused to the 3D-printed spring 100 (via the 3D printing process). Alternatively, the source of the external force may be from an element that is attached (by way of an adhesive, a fixture, or the like) to the 3D-printed spring 100 after the 3D-printed spring 100 has been formed.

In an exemplary embodiment, the 3D-printed spring 100 may comprise an outer structure comprising a plurality of toroidal elements 105, such as toroidal elements 105(1)~105(8). The 3D-printed spring 100 may further comprise a plurality of connectors 110, such as connectors 110(1)~110(7), connected to the outer structure.

In an exemplary embodiment, each toroidal element 105 may comprise an outer surface 200 defined as an outermost boundary of the outer structure. Each toroidal element 105 may further comprise an inner surface 205, opposite to the outer surface 200, and defined as an interior and innermost boundary of the toroidal element 105. Each toroidal element 105 may further comprise a first side edge 300 defined as a surface of the toroidal element 105 that is perpendicular to both the outer surface 200 and the inner surface 205. Each toroidal element 105 may further comprise a second side edge 310 opposite to the first side edge 300 and perpendicular to the both the outer surface 200 and the inner surface 205. The toroidal elements 105(1)~105(8) may be arranged side-by-side, such that the outer surfaces 200 of each toroidal element 105 faces in a same direction and a first side edge 300 of one toroidal element 105 faces a second side edge 310 of a neighboring toroidal element 105. For example, the first side edge 300 of a second toroidal element 105(2) faces the second side edge 310 of a first toroidal element 105(1).

In an exemplary embodiment, each toroidal element spaced apart from a neighboring toroidal element by a distance d. The distance d may be selected according to the particular application. For example, in the case of a compressive 3D-printed spring, the distance d may be larger than in the case of an extension 3D-printed spring to provide varying degrees of overall compression of the 3D-printed spring when compressed. Alternatively, in the case of an extension 3D-printed spring, the distance d may be smaller than in the compressive case to provide extension capabilities and minimal compressive capabilities. In some cases, the distance d may be selected to provide both compression and extension capabilities. In addition, the distance d may be limited by the particular 3D printer used to produce the 3D-printed spring 100, as different 3D printers may have different minimum specifications at which they are able to print the 3D-printed spring 100. For example, a particular 3D printer may require a distance d greater than 0.2 mm, while another 3D printer may require at distance d greater than 0.8 mm.

In various embodiments, the outer structure may comprise any number of toroidal elements 105. The number of toroidal elements 105 may be selected based on the particular application and/or the desired amount of compression, extension, or torsion force. For example, the number of toroidal elements 105 may be increased or decreased to meet the desired overall length L of the 3D-printed spring 100 in a neutral state (i.e., without force applied to 3D-printed spring 100).

In addition, the size of the toroidal elements 105 may vary according to the particular application. For example, larger toroidal elements 105 may be desired in applications where the expected force is greater while smaller toroidal elements 105 may be desired in application where the expected force is smaller. In some embodiments, all of the toroidal elements 105 (e.g., toroidal elements 105(1)~105(8)) may be the same size.

In some embodiments, some toroidal elements 105 may be larger in size than other toroidal elements 105. For example, a first toroidal element (e.g., toroidal element 105(1)) and a last toroidal element (e.g., toroidal element 105(8)) may be larger in size and/or diameter than the middle toroidal elements (e.g., toroidal elements 105(2)~105(7)). In addition or alternatively, one or more middle toroidal elements may be larger in size than a neighboring toroidal element. For example, a fourth toroidal element 105(4) may be larger in size than a third toroidal element 105(3), and fifth toroidal element 105(5) may be larger in size than a sixth toroidal element 105(6). In various applications, the larger-sized toroidal elements may be used as an anchor or attachment point for a secondary component/element.

Figure 2:
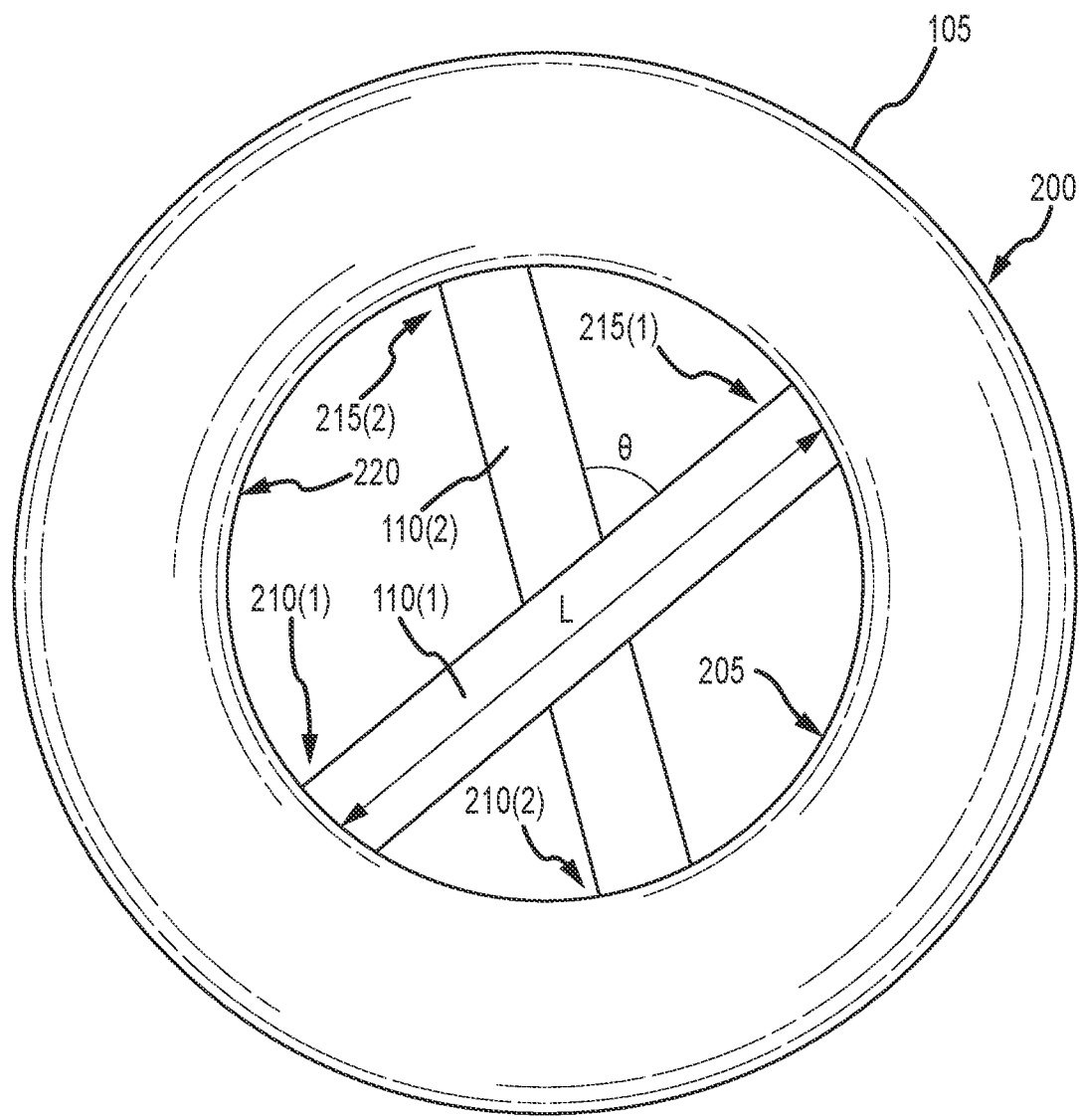
FIG. 2 is a front view of the 3D-printed spring in accordance with an exemplary embodiment of the present technology.

The shape of the toroidal elements 105 may vary according to the particular application. In various embodiments, the outer surface 200 of the toroidal elements 105 may form a circular shape (e.g., as illustrated in FIG. 2), an oblong shape, a square shape, a diamond shape, a hexagonal shape (i.e., a toroidal polyhedral), and the like. In addition, the inner surface 205 may form the same shape as the outer surface 200. For example, in the case of a toroidal element 105 having a circular revolution (FIG. 4), a radius r is constant throughout. Alternatively, in the case of a toroidal element 105 having a square revolution (or rectangular revolution), a width W is constant.

Furthermore, the size and shape may be selected to fit into a particular three dimensional space. In other words, the maximum size and particular shape of the 3D-printed spring 100 may be limited to the maximum parameters of the three dimensional space that the 3D-printed spring will occupy.

In some cases, the overall size and dimensions of the 3D-printed spring 100 may be limited to the capacity of the build chamber for a particular 3D printer (not shown). For example, the 3D printer may have a build chamber having a 15 inch cube capacity. This means that the 3D printer has the ability to produce any 3D-printed spring having overall dimensions less than 15 inches by 15 inches by 15 inches.

In various embodiments, the 3D-printed spring 100 may have any number of connectors 110. The total number of connectors 110 may be based on the total number of toroidal elements 105. In an exemplary embodiment, the total number of connectors is one less than the total number of toroidal elements 105. For example, if the 3D-printed spring has eight (8) toroidal elements 105, then the 3D-printed spring 100 will have seven (7) connectors 110.

In an exemplary embodiment, each connector 110 may comprise a first end 210 and an opposing second end 215. The first end 210 may connect to the inner surface 205 of one toroidal element 105 while the second end 215 may connect to the inner surface 205 of a neighboring toroidal element 105. For example, and referring to FIGS. 2, 4, and 5, a first end 210(1) of a first connector 110(1) is connected to the inner surface 205 of the first toroidal element 105(1) and a second end 215(1) of the first connector 110(1) is connected to the inner surface 205 of the second toroidal element 105(2). Similarly, a first end 210(2) of a second connector 110(2) is connected to the inner surface 205 of the second toroidal element 105(2) and a second end 215(2) of the second connector 110(2) is connected to the inner surface 205 of a third toroidal element 105(3).

In various embodiments, the location of the connection points changes with every other connector, thus the overall position and direction of every other connector changes relative to an immediately proximate connector. For example, odd-numbered connectors, such as connectors 110(1), 110(3), 110(5), and 110(7), have a different overall position and direction from the even-numbered connectors, such as connectors 110(2), 110(4), 110(6), and 110(8).

In one embodiment, the odd-numbered connectors, such as connectors 110(1), 110(3), 110(5), and 110(7), may be arranged to have the same direction and position with respect to each other when the 3D-printed spring 100 is in the neutral state. This may be achieved by arranging the first ends of the odd-numbered connectors to have a same position, relative to a reference point 220, on the respective toroidal element 105 and arranging the second ends of the odd-numbered connectors to have a same position, relative to the reference point, on the respective toroidal element 105.

Similarly, even-numbered connectors, such as connectors 110(2), 110(4), 110(6), and 110(8), may be arranged to have the same direction and position with respect to each other when the 3D-printed spring is in the neutral state. This may be achieved by arranging the first ends of the even-numbered connectors to have a same position, relative to the reference point 220, on the respective toroidal element 105 and arranging the second ends of the even-numbered connectors to have a same position, relative to the reference point 220, on the respective toroidal element 105.

In other embodiments, the even-numbered connectors may be offset from each other and the odd-numbered connectors may be offset from each other. In other words, the position of the first and second ends of the even-numbered connectors, relative to the reference point 220, may vary from one even-numbered connector to another even-numbered connector, and the position of the first and second ends of the odd-numbered connectors, relative to the reference point 220, may vary from one odd-numbered connector to another odd-numbered connector.

In various embodiments, and when viewed from the front (e.g., as illustrated in FIG. 2), one connector and an immediately-adjacent connector may form a t-shape or an x-shape. The pattern may be described according to an angle θ formed between one connector, such as the first connector 110(1), and an immediately adjacent connector, such as the second connector 110(2). The degree of the angle θ is related to the position of one connector relative to an immediately-adjacent connector and may range from zero to ninety degrees.

Figure 5:
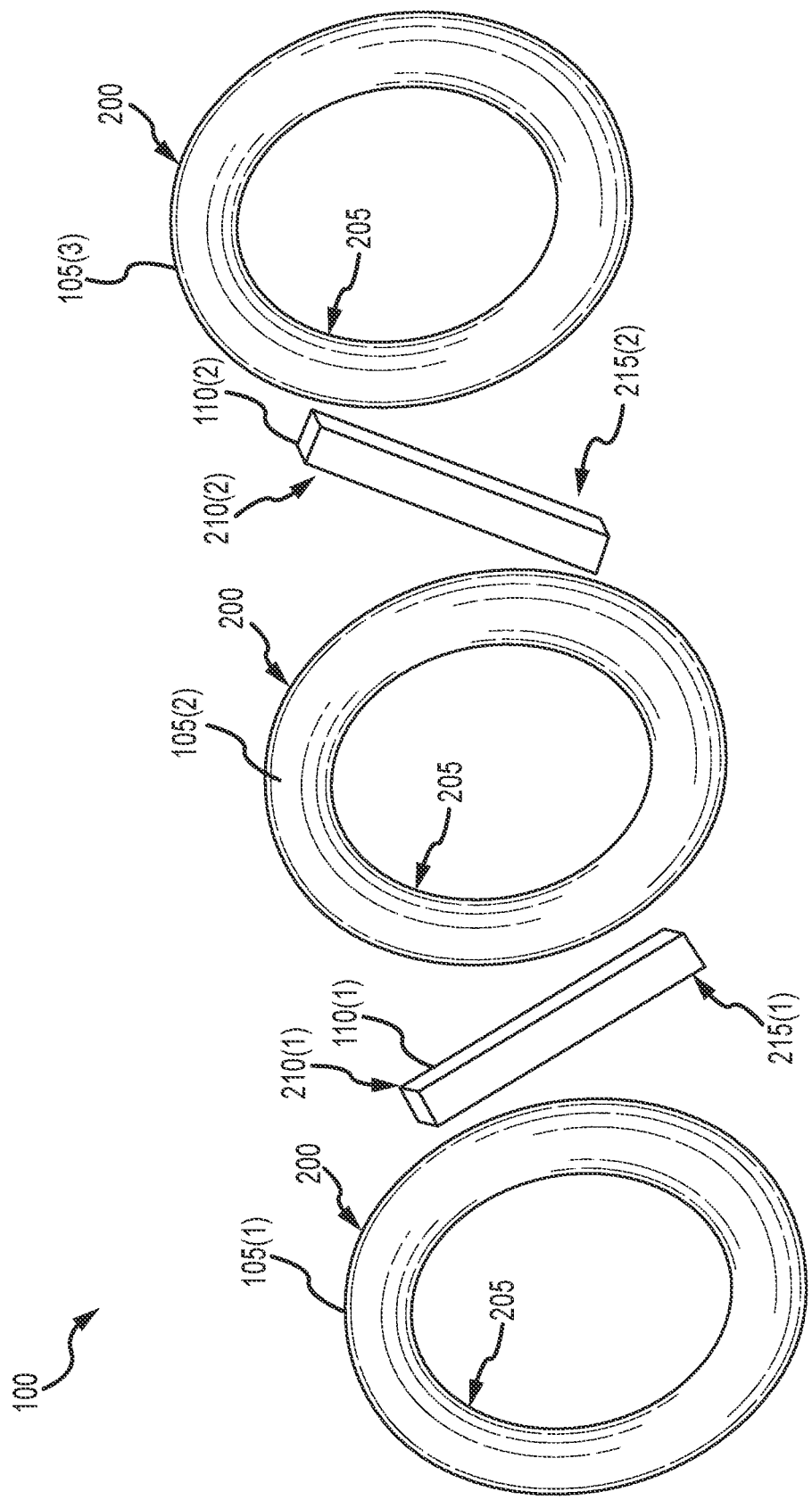
FIG. 5 is an exploded view of a portion of the 3D-printed spring of FIG. 1 in accordance with an exemplary embodiment of the present technology.

In various embodiments, the connectors 110 may have any suitable size and shape. In one embodiment, the connectors 110 are shaped as a square prism (e.g., as illustrated in FIG. 5). In other embodiments, the connectors 110 are shaped as a triangular prism, a hexagonal prism, a pentagonal prism, or any other suitable prism shape. In other embodiments, the connectors 110 are shaped as a cylinder. In addition, in an exemplary embodiment, the connectors 110 are linear. Alternatively, the connectors 110 may be curved (arched), have an S-shape, or any other suitable arrangement.

The size and shape of the connectors 110 may be based on the type of force and/or the amount of force and/or the amount of torque desired. For example, an overall circumference of each connector 110 may be varied to increase or decrease the force of the 3D-printed spring 100. In various embodiments, the larger the overall circumference, the greater the amount of extension (tensile) and/or compression force. In addition, the larger the overall circumference, the greater the amount of torsion force required to twist the 3D-printed spring 100.

In addition, a length L of each connector 110 may be varied to provide a particular type and/or amount of force. For example, longer connectors 110 may be used to provide compressive force, while shorter connectors 110 may be used to provide tensile force. In the case of a compressive 3D-printed spring, the longer the length L of the connectors 110, the greater the compressive force. In the case of an extension 3D-printed spring, the shorter the length L of the connectors 110, the greater the tensile force. In various embodiments, the length L of each connector 110 will dictate the distance d that separates one toroidal element 105 from a neighboring toroidal element 105.

In an exemplary application, the 3D-printed spring 100 may be integrated into a clip 700, such as a hair clip. In an exemplary embodiment, the clip 700 may comprise the 3D-printed spring 100, a first member 705, and a second member 710. The first member 705 may comprise a first grip portion 715 and a first comb-shaped portion 720. Similarly, the second member 710 may comprise a second grip portion 725 and a second comb-shaped portion 730.

The first member 705 may be connected or otherwise fused (via the 3D printing process) to one or more points or locations of the 3D-printed spring 100. Similarly, the second member 710 may be connected or otherwise fused (via the 3D printing process) to one or more points or locations of the 3D-printed spring 100. For example, the first member 705 may be connected to a first toroidal element 105 (e.g., toroidal element 105(1)) of the 3D-printed spring 100 and the second member 710 may be connected to a last toroidal element 105 (e.g., toroidal element 105(8)) of the 3D-printed spring 100. For example, the first member 705 may connect to the entire outer surface 200 of the first toroidal element 105(1) or one or more points or locations on the outer surface 200 of the first toroidal element 105(1). Similarly, the second member 710 may connect to the entire outer surface 200 of the last toroidal element 105(8) or one or more points or locations on the outer surface 200 of the last toroidal element 105(8).

The first comb-shaped portion 720 may comprise a first plurality of fingers and the second comb-shaped portion 730 may comprise a second plurality of fingers. The first plurality of fingers may interleave the second plurality of fingers when the clip 700 and 3D-printed spring 100 are in the neutral state (e.g., as illustrated in FIGS. 7-10).

In the present application, and referring to FIGS. 1 and 7-10, the 3D-printed spring 100 may function as a torsion spring, such that when the first and second grip portions 715, 725 are squeezed together, the first member 705 applies a rotational force in a first direction R1 to the first toroidal element 105(1), while the second member 710 applies a rotational force in a second direction R2, opposite to the first direction, to the last toroidal element 105(8). This rotational force causes the first and second comb-portions 720, 730 to separate from each other.

In the present application, the clip 700 may be produced as a single, integrated object. In other words, the clip 700 may not be made up of multiple, discrete components.

Various embodiments of the present technology may be produced using a combination of computer-aided design (CAD) software (not shown), such as Fusion 360, and a 3D printer (not shown), such as an HP Multi Jet Fusion 5210 or similar. The CAD software may be used to create a 3D model of the spring 100. The 3D model may be represented as one or more files containing data, information, and/or instructions (i.e., CAD files) related to aspects of the 3D-printed spring 100, such as overall size, dimensions, spacing between the toroidal elements 105, and the size, shape and length of the connectors 110. In addition, a secondary software (not shown) may be used to "slice" the 3D model into hundreds or thousands of layers based on a desired print orientation of the spring 100. The secondary software may generate a code that indicates the number of layers, temperature, layer height, print speed, and the like. The 3D printer may be configured to receive and execute the CAD files and/or the code from the secondary software.

The files containing data and/or instructions may also relate to a print orientation of the 3D-printed spring 100. For example, the print orientation may indicate that the 3D-printed spring 100 will be formed/printed in a first orientation (e.g., as illustrated in FIG. 3, wherein the toroidal elements 105 are oriented vertically) or in a second orientation (e.g., with the toroidal elements 105 orientated horizontally). The 3D-printed spring 100 may be produced using any suitable 3D-printer in combination with any suitable, compatible CAD software.

The 3D printer may be configured to form or print the 3D-printed spring 100. The 3D printer may form/print the 3D-printed spring 100 according to the CAD files and/or the secondary software code. For example, the 3D printer may expel a layer of a print material, such as a plastic material. For example, the print material may comprise a powder-based material (e.g., PA 11 (also known as Polyamide 11 or Nylon 11) and PA 12 (also known as Polyamide 12 or Nylon 12), thermoplastic polyurethane (TPU), nylon plastic infused with glass beads (i.e., PA glass beads), and the like. Next, the 3D printer may deposit a fusing agent to the print material to fuse the print material. The 3D printer may then apply an energy source, such as infrared light or heat lamps, to the fused material to fuse the layers to each other. The 3D printer repeats this process for each layer until all layers have been completed, and thus completing the formation of the 3D-printed spring 100.

In various embodiments, the 3D-printed spring 100 may be printed as a single, continuous component. In addition, the 3D-printed spring 100 may be printed in any orientation and without the aid of support structures or other restraints. For example, the 3D-printed spring 100 may be printed such that the toroidal elements 105 have a horizontal orientation (e.g., a first print orientation). Alternatively, the 3D-printed spring 100 may be printed such that the toroidal elements 105 have a vertical orientation (e.g., a second print orientation).

In various embodiments, the 3D-printer may print the clip 700 using a plastic material, such a powder-based material (e.g., PA 11 (also known as Polyamide 11 or Nylon 11) and PA 12 (also known as Polyamide 12 or Nylon 12), thermoplastic polyurethane (TPU), nylon plastic infused with glass beads (i.e., PA glass beads), and the like. In addition, the powder-based material may contain coloring, such that the clip 700 may be printed in any desirable color.

For example, the 3D printer may be configured to receive and execute one or more files containing data and/or instructions related to aspects of the clip 700, such as overall size and dimensions of the clip 700, including the dimensions and specifications of the first and second comb-shaped portions 720, 730, the dimensions and specifications of the first and second grip portions 715, 725, and dimensions and specifications of the 3D-printed spring 100 integrated within the clip 700, such as the overall dimensions of the 3D-printed spring 100, the spacing between the toroidal elements 105, and the size, shape and length of the connectors 110.

The files containing data and/or instructions may also relate to a print orientation of the clip 700. The clip 700 may be produced using any suitable 3D-printer in combination with any suitable, compatible CAD software.

In various embodiments, the clip 700 may be printed as a single, continuous component. In addition, the clip 700 may be printed in any orientation and without the aid of support structures or other restraints.

Various embodiments of the present technology may undergo various post processing treatments, such as abrasion blasting, dyeing, graphite blasting, tumbler/mass finishing, polishing, automotive painting, electroplating, vapor smoothing, sanding, chrome painting, and hydro-dipping.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A 3D-printed spring, comprising:
a plurality of toroidal elements aligned along a center axis that is common to each toroidal element, wherein each toroidal element is separated from a directly-adjacent toroidal element by a distance; and
a plurality of connectors, wherein each connector comprises:
a first end connected to an inner surface of a first toroidal element at a first position relative to the center axis; and
a second end connected to an inner surface of a second directly-adjacent toroidal element at a second position relative to the center axis, wherein a midportion of each connector between the first and second ends extends across the distance separating the first and second toroidal elements.

2. The 3D-printed spring according to claim 1, wherein the plurality of aligned toroidal elements form a cylinder shape.

3. The 3D printed spring according to claim 1, wherein:
the inner surface of each toroidal element faces the center axis; and
each toroidal element comprises an outer surface facing a direction opposite that of the inner surface.

4. The 3D-printed spring according to claim 1, wherein the number of connectors is one less than the number of toroidal elements.

5. The 3D-printed spring according to claim 1, wherein each connector, from the plurality of connectors, is cuboid-shaped.

6. The 3D-printed spring according to claim 1, wherein each connector, from the plurality of connectors, has a triangular prism shape.

7. The 3D-printed spring according to claim 1, wherein each connector, from the plurality of connectors, is cylinder-shaped.

8. A method for making a 3D-printed spring having a plurality of toroidal elements and a plurality of connectors with a 3D printer, comprising:
executing a file with the 3D printer, wherein the file comprises instructions defining:
an overall size of the 3D-printed spring;
a size, a shape, and a length of each connector;
a spacing between adjacent toroidal elements;
printing the 3D-printed spring according to the instructions, wherein the 3D-printed spring is printed as a single, continuous element and each connector comprises:
a first end connected to an inner surface of a first toroidal element at a first position relative to a center axis of the plurality of toroidal elements;
a second end connected to an inner surface of a second directly-adjacent toroidal element at a second position relative to the center axis, wherein a midportion of each connector between the first and second ends extends across the distance separating the first and second toroidal elements.

9. The method according to claim 8, wherein the file containing instructions further relates to a print orientation of the 3D-printed spring.

10. The method according to claim 8, wherein the 3D-printed spring is printed without the use of support structures.

11. The method according to claim 8, wherein the 3D-printed spring is printed with a powder-based material.

12. The method according to claim 8, further comprising subjecting the 3D-printed spring to a post-processing treatment comprising at least one of: abrasion blasting, dyeing, graphite blasting, tumbler/mass finishing, polishing, automotive painting, electroplating, vapor smoothing, sanding, or chrome painting.

13. A clip, comprising:
an inner spring comprising:
a plurality of toroidal elements aligned along a center axis that is common to each toroidal element, wherein each toroidal element is spaced apart from a directly-adjacent toroidal element; and
a plurality of connectors, comprising:
a first connector connected to:
an inner surface at a first position relative to the center axis of a first toroidal element, from the plurality of toroidal elements; and
a first location on an inner surface at a second position relative to the center axis of a second toroidal element, from the plurality of toroidal elements; and a second connector connected to:
- a second location on the inner surface of the second toroidal element at a third position relative to the center axis; and
- a first location on an inner surface at a fourth position relative to the center axis of a third toroidal element, from the plurality of toroidal elements;

a first member connected to an outer surface of at least one toroidal element, the first member comprising a first grip portion and a first comb-shaped portion; and a second member connected to an outer surface of at least one other toroidal element, the second member comprising a second grip portion and a second comb-shaped portion capable of interleaving with the first comb-shaped portion.

14. The clip according to claim 13, wherein the plurality of aligned toroidal elements form a cylinder shape.

15. The clip according to claim 13, wherein the inner surface faces inward toward the center axis and the outer surface faces outward away from the center axis.

16. The clip according to claim 13, wherein the number of connectors is one less than the number of toroidal elements.

17. The clip according to claim 13, wherein the first connector is arranged perpendicular to the second connector.

18. The clip according to claim 13, wherein the inner surface and the outer surface encircle the center axis.

19. The clip according to claim 13, wherein the first and second connectors are linear and rigid.

* * * * *